United States Patent [19]  
Matsubara et al.

[11] Patent Number: 4,819,188  
[45] Date of Patent: Apr. 4, 1989

[54] IMAGE PROCESSING APPARATUS

[75] Inventors: Mitsuyoshi Matsubara, Tochigi; Yukinobu Ito, Ootawara, both of Japan

[73] Assignee: Kabushiki Kaisha Toshiba, Kawasaki, Japan

[21] Appl. No.: 800,793

[22] Filed: Nov. 22, 1985

[30] Foreign Application Priority Data

Nov. 22, 1984 [JP] Japan .................. 59-248463  
Jul. 23, 1985 [JP] Japan .................. 60-161181

[51] Int. Cl.$^4$ .......................... G06F 15/42  
[52] U.S. Cl. .................. 364/413.23; 378/901  
[58] Field of Search .............. 364/414; 378/901

[56] References Cited

U.S. PATENT DOCUMENTS

Re. 31,200  4/1983  Sukonick .  
3,983,394  9/1976  Martone et al. .  
4,032,787  6/1977  Albert .................. 378/99  
4,069,511  1/1978  Lelke .  
4,205,389  5/1980  Heartz .  
4,315,318  2/1982  Kato .................. 378/99  
4,356,398  10/1982  Komaki .................. 364/414  
4,356,482  10/1982  Oguchi .  
4,364,090  12/1982  Wendland .  
4,387,428  6/1983  Ishida et al. .................. 364/414  
4,414,628  11/1983  Ahuja et al. .  
4,496,944  1/1985  Collmeyer et al. .  
4,550,315  10/1985  Bass et al. .  
4,573,080  2/1986  Maze .

Primary Examiner—Joseph Ruggiero  
Assistant Examiner—Gail O. Hayes  
Attorney, Agent, or Firm—Finnegan, Henderson, Farabow, Garrett, & Dunner

[57] ABSTRACT

In a radiation image recording system for recording a processed image on a recording medium by frequency emphasis processing and gradation processing of radiation image data from an object to be examined, an image processing apparatus performs frequency emphasis processing and gradation processing of the radiation image data for a later image recording stage. The image processing apparatus calculates two unsharp mask data Sus1 and Sus2 for two different mask sizes, and substantially simultaneously forms two processed image data by frequency emphasis processing and gradation processing of the radiation image data using the unsharp mask data Sus1 and Sus2.

11 Claims, 11 Drawing Sheets

F I G. 6
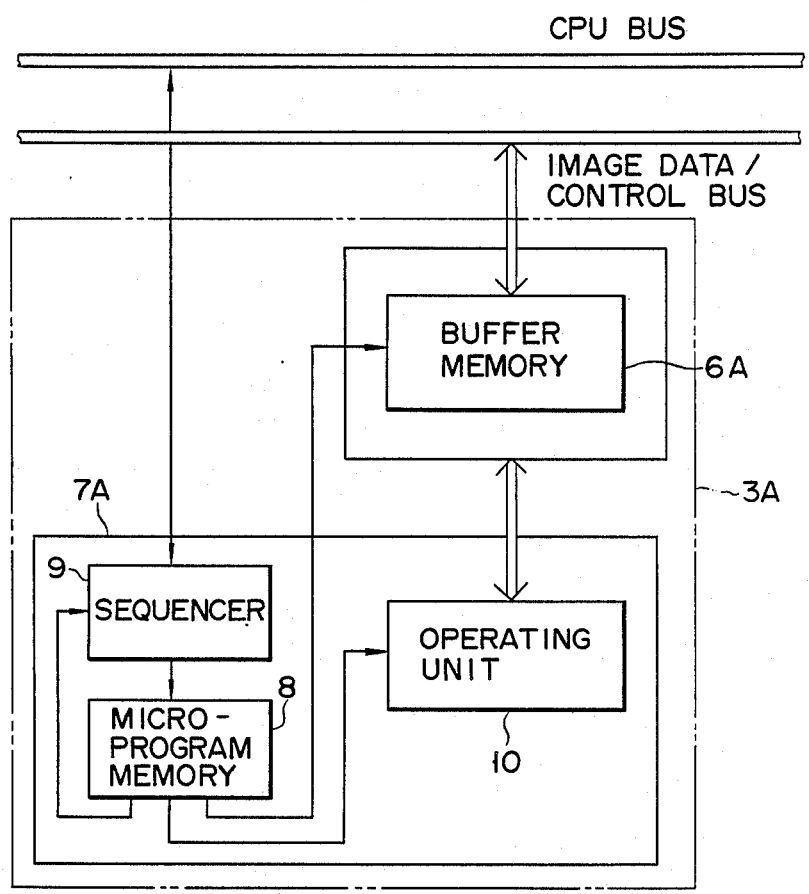

F I G. 10
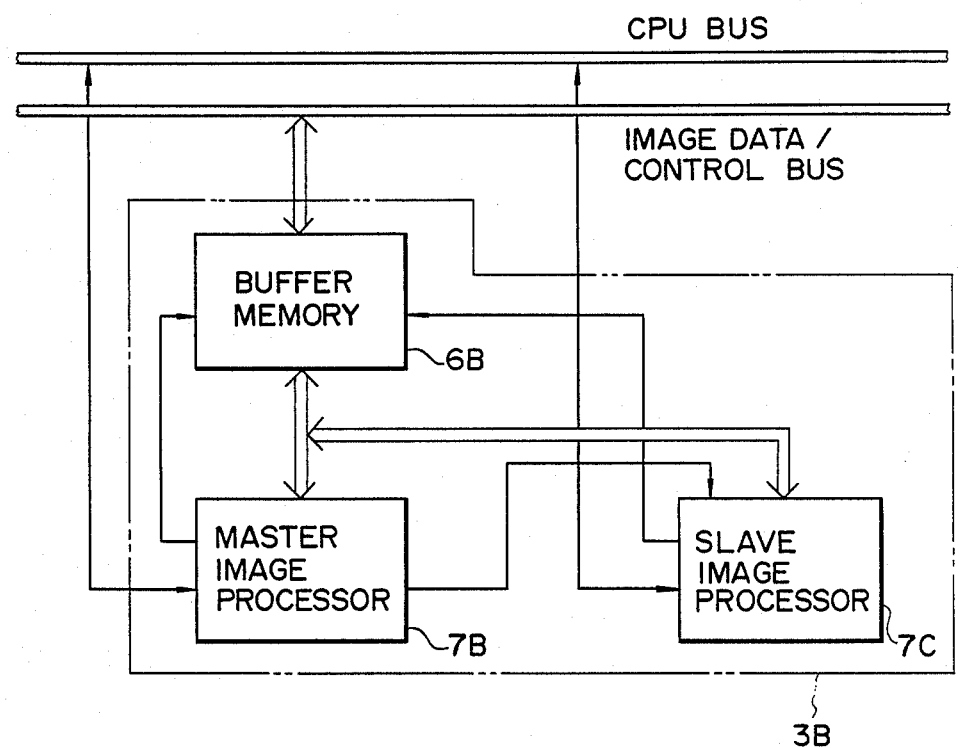

IMAGE PROCESSING APPARATUS

BACKGROUND OF THE INVENTION

The present invention relates to a radiation image recording system mainly used for medical diagnosis and, more particularly, to an image processing apparatus for obtaining image data from an original radiation image formed by transmitting radiation through an object to be examined, and forming a visible image on a final recording medium.

An example of a radiation image recording system using X-rays as radiation will be described with reference to FIG. 1.

The X-ray image recording system comprises an X-ray sensing apparatus 1, an image scanning apparatus 2, an image processing apparatus 3, an image reproducing apparatus 4 and an image recording apparatus 5.

In the X-ray sensing apparatus 1, an object to be examined is irradiated with X-rays, and energy corresponding to the X-rays transmitted through the object is accumulated on a phosphor plate comprising an accumulation type phosphor. Energy distribution on the phosphor plate corresponds to X-ray image data obtained from the X-rays transmitted through the object. When the phosphor plate is irradiated with light length, the accumulated energy is thereby stimulated and light is emitted from the phosphor plate.

The image scanning apparatus 2 radiates an energy-stimulating light beam having a wavelength within the range of between 500 to 800 nm on the phosphor plate in which the energy for forming an X-ray image by the X-ray sensing apparatus 1 is accumulated. Thus, the energy accumulated on the phosphor plate is stimulated, thereby emitting phosphorescent light having a wavelength within the range of between 300 to 500 nm. This light is then detected by a photodetector (e.g., a photoelectron multiplier, a photodiode, or the like) which detects light in the above wavelength range, and the image accumulated on the phosphor plate is obtained.

In the image processing apparatus 3, X-ray image data read by the imagescanning apparatus 2, i.e., an output signal from the photodetector, is nonlinearly amplified and is converted into a digital signal by an analog-to-digital (A/D) converter. Thereafter the digital signal is subjected to frequency emphasis processing and gradation processing, as needed. The resultant data is stored in a storage means such as an image memory in the image processing apparatus 3.

The image reproducing apparatus 4 sequentially reads out digital image data stored in the image memory of the image processing apparatus 3, and converts the readout data into an analog signal with a digital-to-analog (D/A) converter. The analog signal is then amplified by an amplifier and supplied to a recording light emitting element so as to convert the analog image data into optical data.

The image recording apparatus 5 radiates the optical data through, e.g., a lens system, onto a recording medium such as film, forming an X-ray image thereon. The X-ray image formed on the recording medium by the image recording apparatus 5 may be subjected to observation for such use as diagnosis.

The conventional image processing apparatus 3 in the above-mentioned system has a configuration as shown in FIG. 2.

The image processing apparatus 3 comrpises a buffer memory 6 and image processor 7.

The buffer memory 6 is connected to an image data/control bus, and stores X-ray image data. The image processor 7 is connected to a central processing unit (CPA) bus, and carried out frequency emphasis processing and gradation processing, with respect to the X-ray image data stored in the buffer memory 6, in accordance with a command supplied from a CPU (not shown) through the CPU bus. Frequency emphasis processing emphasizes a predetermined special frequency component in the image data, and gradation processing gives predetermined gradation characteristics to the image data.

An algorithm performed by the image processing image processing of the apparatus 3 will be described next.

The image processing is executed by an operation in accordance with the following formula:

$$S = \gamma[S0 + \beta(S0 - Sus)] \tag{1}$$

In the formula (1).
S0: Original image data read out from the phosphor plate by the image scanning apparatus 2
Sus: Unsharp mask data represented by $$Sus = \Sigma_{i,j} Si,j / N^2$$

(where Si,j: data for coordinates (i,j) of an original image and N: parameter indicating a mask size), unsharp mask data meaning data of an unsharp image (to be referred to as an "unsharp mask" hereinafter) at every scanning point (i.e., pixel) so that an original image is blurred to include frequency components below a predetermined super-low frequency component
$\beta$: an emphasis coefficient of a high frequency component
$\gamma$: a gradation coefficient In the formula (1), the operation of $[S0 + \beta(S0 - Sus)]$ is known as frequency emphasis processing for emphasizing a predetermined special frequency component. The operation of $\gamma[S0 + \beta(S0 - Sus)]$ is known as gradation processing for changing the gradation of the X-ray image data subjected to frequency emphasis processing in accordance with, e.g., predetermined characteristics (see U.S. Pat. No. 4,387,428). Normally, gradation processing is performed by looking up a given table prepared in advance.

X-ray image data processing based upon the above-mentioned algorithm will be described with reference to FIGS. 3 and 4. FIG. 3 illustrates each pixel data p of X-ray image data when the parameter (mask size) N of the unsharp mask is 9. FIG. 4 schematically shows a microprogram stored in advance in the image processor 7 shown in FIG. 2. Referring to FIG. 3, i and j indicate coordinates of each scanning point, i.e., a pixel.

When processing starts, an intialization start command is supplied from the CPU through the CPU bus to the image processor 7. The processor 7 sets operational parameters, namely, the emphasis coefficient $\beta$, the gradation coefficient $\gamma$ and the mask size N in accordance with the processing information set by and supplied from a control console (not shown).

When this setting operation ends, the processor 7 awaits a processing start command from the CPU at an identical program count position on the microprogram. While waiting, the processor 7 is in a hold state.

The CPU checks the standby state of peripheral equipment of the system, and when checking is completed, supplies the processing start command to the processor 7. Upon reception of this command, the processor 7 reads out the X-ray image data stored in the buffer memory 6, and starts the operation based upon the formula (1).

The operation is conducted for each pixel p of the unsharp mask in accordance with the processing routine of the microprogram, and the resultant pixel data is temporarily stored in the memory 6.

Prior to the processing operation, the number of pixels p for one line is set by a store command in the microprogram. The processor 7 repeats the operation and output of pixel data for the number of times corresponding to the preset number of pixels p. Repetitive processing is executed in such a manner that after a certain pixel is processed and the resultant data is output, the microprogram is returned to the start of the operation by a return command, and the process begins again for the next pixel. When the process has been repeated the preset number of times, i.e., one line is completed, the microprogram is returned to its original flow by a load command.

In this manner, when processing for one line is completed, the control is switched to the pixel processing for the next line. The processing, operation and output of pixel data is repeated until the last pixel data p, i.e., S(i,j) is processed.

Note that the time required for switching lines is so short when compared to the time required for the operation and output of pixel data that it can be ignored.

In this manner, the operation and output of pixel data is performed by the image processing apparatus 3. The image data subjected to frequency emphasis processing and gradation processing is converted into optical data by the image reproducing apparatus 4. Thereafter, the optical data in the form of a processed image is recorded on a recording medium by image recording apparatus 5.

In the conventional image processing apparatus 3, in order to allow comparison of processed images, two different sets of values for the emphasis coefficient $\beta$ and the gradation coefficient $\gamma$ can be used in the formula (1). In the system comprising an image processing apparatus of this type, two image data subjected to frequency emphasis processing and gradation processing using two emphasis coefficients $\beta 1$ and $\beta 2$ and two gradation coefficients $\gamma 1$ and $\gamma 2$ in the formula (1) are converted into optical, data by the image reproducing the apparatus 4, and are subjected to recording by the image recording apparatus 5. In the image recording apparatus 5, as shown in FIG. 5, processed images A1 and B1 having different emphasis and gradation coefficients $\beta$ and $\gamma$ are formed.

In the image processing apparatus 3 when processing using an unsharp mask having a mask size of N×N is conducted with respect to pixel data p having coordinates S(i−((N−1)/2), j−((N−1)/2) as shown in FIG. 3, the unsharp mask data Sus can be calculated only after the processing of the pixel data p having coordinates S(i,j) is completed by the processor 7. The calculated result of the unsharp mask data Sus is subjected to frequency emphasis processing and gradation processing using two emphasis coefficients $\beta 1$ and $\beta 2$ and two gradation coefficients $\gamma 1$ and $\gamma 2$. As a result, two processed images A and B are formed on a singe recording medium X, as shown in FIG. 5.

In this case, however, since the parameter of the mask size of the unsharp mask of both the processed images A and B formed on the single recording medium X is N, the processed images A and B have no difference in contrast.

If two images having different contrasts are to be obtained by a conventional apparatus, two buffer memories and two image processors must be provided in the image processing apparatus. For this reason, the configuration of the image processing apparatus becomes complex, and processing efficiency and throughput is impaired.

SUMMARY OF THE INVENTION

It is an object of the present invention to provide an image processing apparatus which can form, in a short period of time, two processed images having different contrasts on a single recording medium so as to allow easy and reliable diagnosis using the processed images, and improve image processing efficiency and throughput.

According to the present invention, there is provided an image processing apparatus wherein, in order to obtain a visible image of a processed image on a recording medium by scanning a radiation transmission image of an object to be examined and performing predetermined processing with the obtained image data, unsharp mask data Sus corresponding to each pixel data is calculated from original radiation image data S0, and the data Sus is subjected to frequency emphasis processing and gradation processing by an operation represented by a formula $$S = \gamma[S0 + \beta(S0 - Sus)]$$

(where $\beta$ is an emphasis coefficient, and $\gamma$ is a gradation coefficient) so as to obtain processed image data which is to be subjected to image recording on an image recording medium. The apparatus has an operating means. The operating means calculates two unsharp mask data Sus1 and Sus2 associated with two different preset mask sizes, and performs frequency emphasis processing and gradation processing of the unsharp mask data Sus1 and Sus2 so as to obtain two processed image data at substantially the same time.

According to an image processing apparatus of the present invention, since two processed images processed with different unsharp mask sizes are formed on a single recording medium, two images having different contrasts with respect to an identical original image can be simultaneously observed on the single recording medium, thereby allowing easy and reliable diagnosis.

In this apparatus, since processing with different unsharp mask sizes can be conducted at the same time, radiation image data can be processed with high efficiency, and high throughput of the total system can be obtained.

BRIEF DESCRIPTION OF THE DRAWINGS

Fi a block diagram showing a schematic arrangement of, a total radiation image recording system;

FIG. 6 is a block diagram showing an arrangement of an image processing apparatus according to a first embodiment of the present invention;

FIG. 10 is a block diagram showing a schematic arrangement of an image processing apparatus according to a second embodiment of the present invention;

DETAILED DESCRIPTION OF THE PREFERRED EMBODIMENTS

Figure 1:
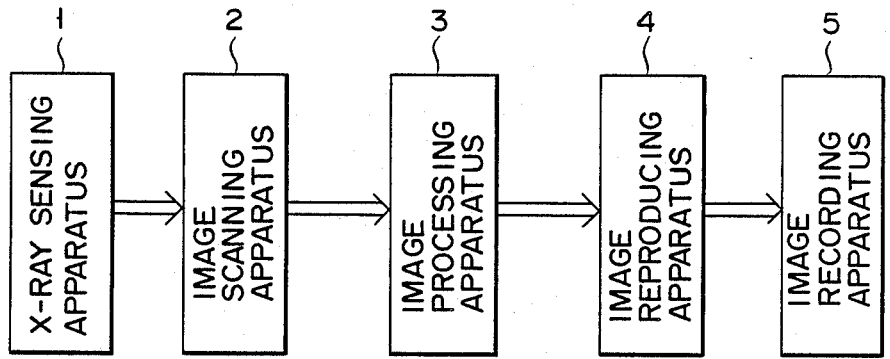
Figure 2:
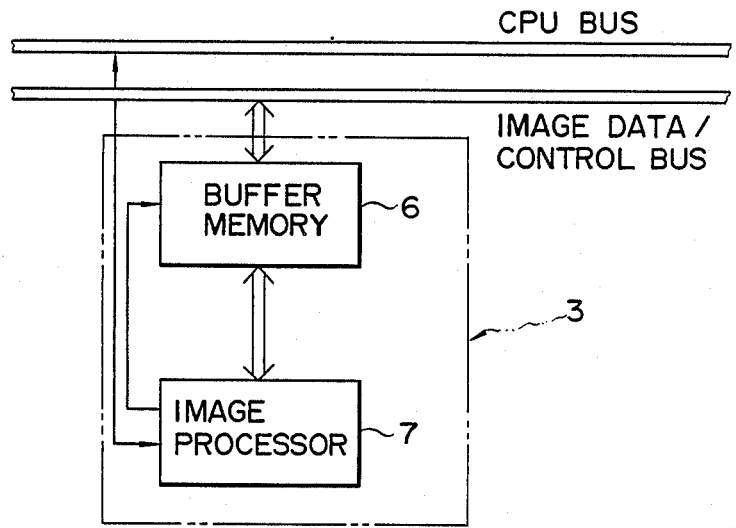
FIG. 2 a block diagram showing a conventional image processing apparatus used in the system shown in FIG. 1.

An image processing apparatus according to a first embodiment of the present invention has substantially the same arrangement as that of the conventional image processing apparatus shown in FIG. 2, and is shown in FIG. 6.

An image processing apparatus 3A has a buffer memory 6A and an image processor 7A. The buffer memory 6A is the same as the buffer memory 6 in the conventional apparatus shown in FIG. 2. The image processor 7A processes X-ray image data stored in the memory 6A in accordance with an image processing algorithm, and is responsive to commands from a CPU so as to execute processing in accordance with a microprogram to be described later.

The processor 7A comprises a microprogram memory 8, a sequencer 9, and an operating unit 10. The memory 8 stores a microprogram for processing, and micro code instructions of the microprogram are read out as desired from the memory 8. The memory 8 comprises a pipeline register utilized for reading out the micro codes. The sequencer 9 supplies to the memory 8 the address of an instruction to be read out in response to commands supplied from the CPU through a CPU bus, thereby controlling the processing microprogram. The operating unit 10 executes an operation of image data stored in the memory 6A in response to the micro code accessed by the sequencer 9 and generated from the memory 8. The operating unit 10 has four arithmetic operation functions, and can conduct an operation in accordance with the formula (1).

The micro codes generated from the memory 8 are also supplied to the memory 6A. A signal for controlling the flow sequence of the apparatus 3A is fed back from the memory 8 to the sequencer 9.

A micro code group has a bit length of, e.g., 32 to 64 bits, and each bit serves as a control signal for directly controlling the unit 10 and the memory 6A.

A clock signal having a period on the order of, e.g. several hundred of nanoseconds is prepared for synchronizing the processor 7A with the memory 6A, and is controlled by the CPU so as to execute the processing microprogram.

The processor 7A stores a $\beta$ table including a number of emphasis coefficients $\beta_1$, $\beta_2$, etc. and a $\gamma$ table including a number of gradation coefficients $\gamma_1$, $\gamma_2$, etc.

Figure 3:
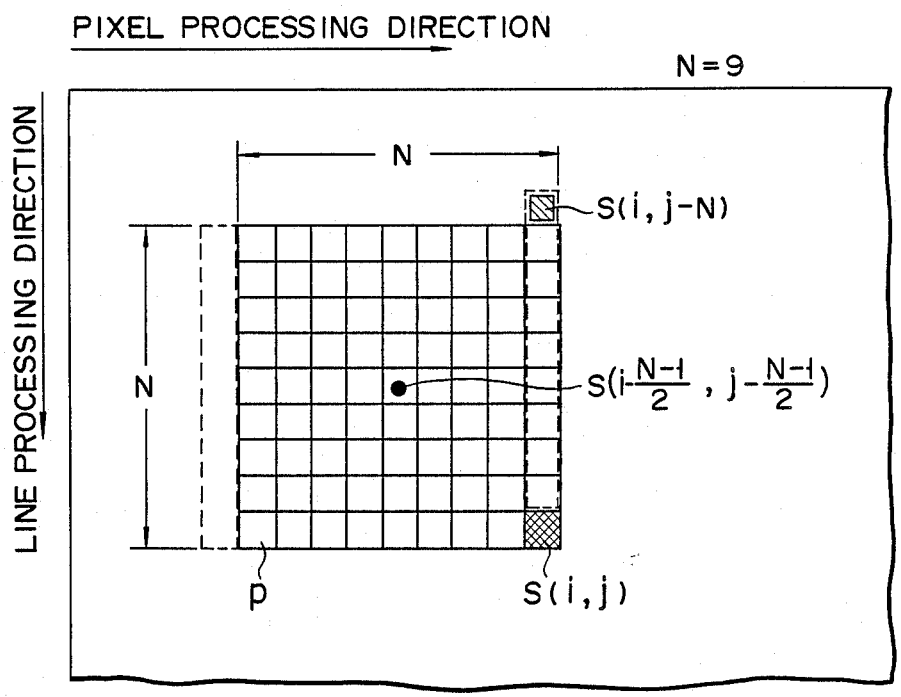
FIG. 3 is a view for explaining image processing of the apparatus shown in FIG. 2.
Figure 4:
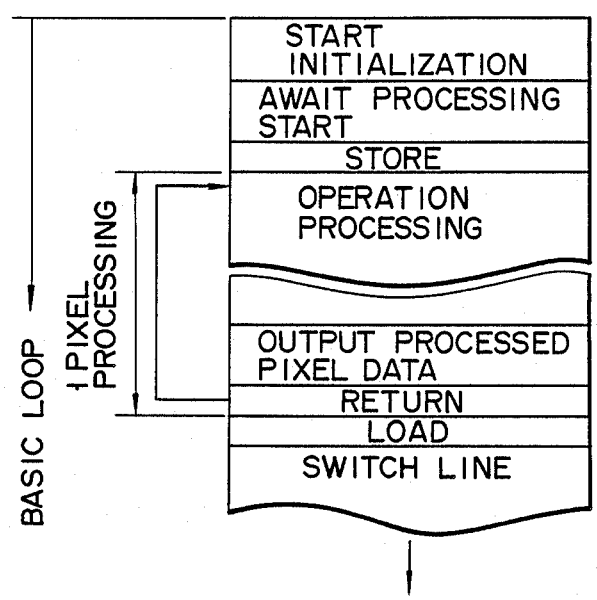
FIG. 4 is an illustration showing a schematic microprogram for the processing in the apparatus shown in FIG. 2.
Figure 5:
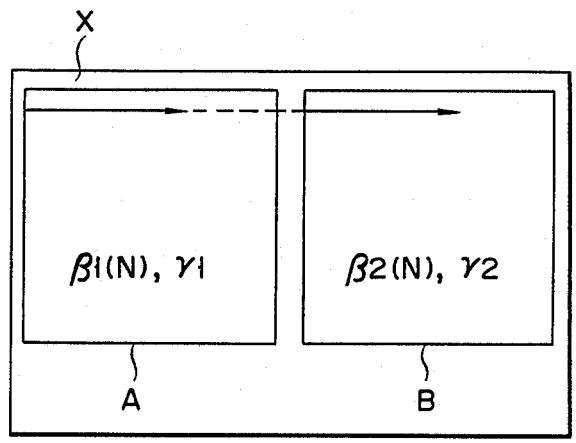
FIG. 5 is an illustration showing an image formed on a recording medium by the processing of the apparatus shown in FIG. 2.
Figure 7:
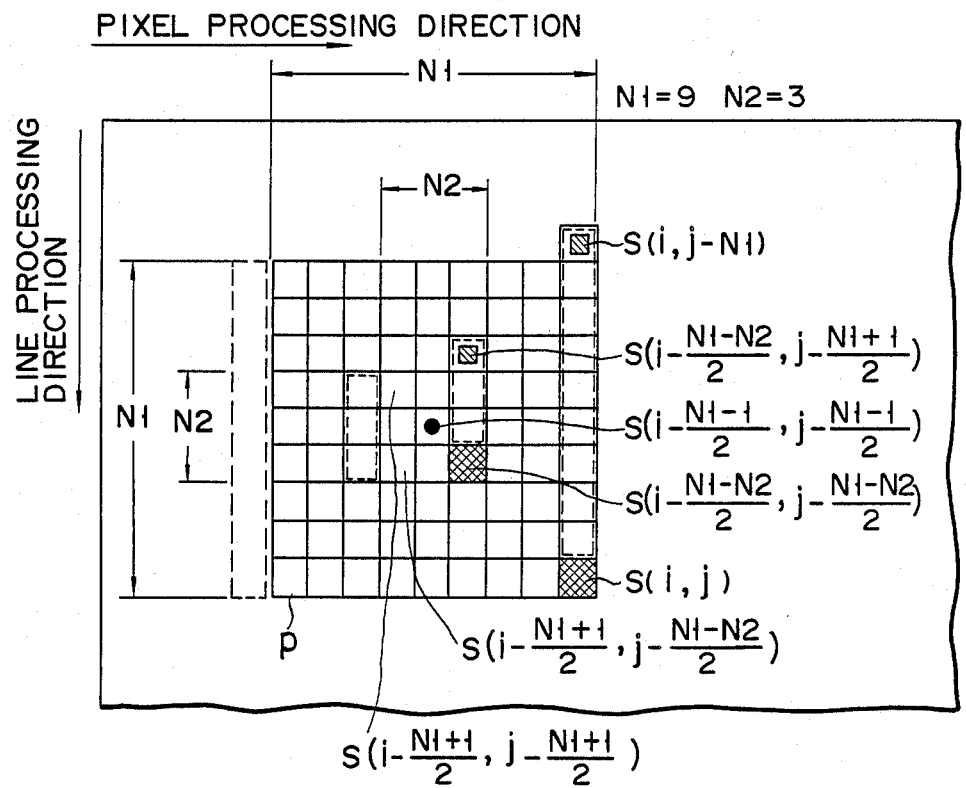
FIG. 7 is a view for explaining image processing of the apparatus shown in FIG. 6.
Figure 8:
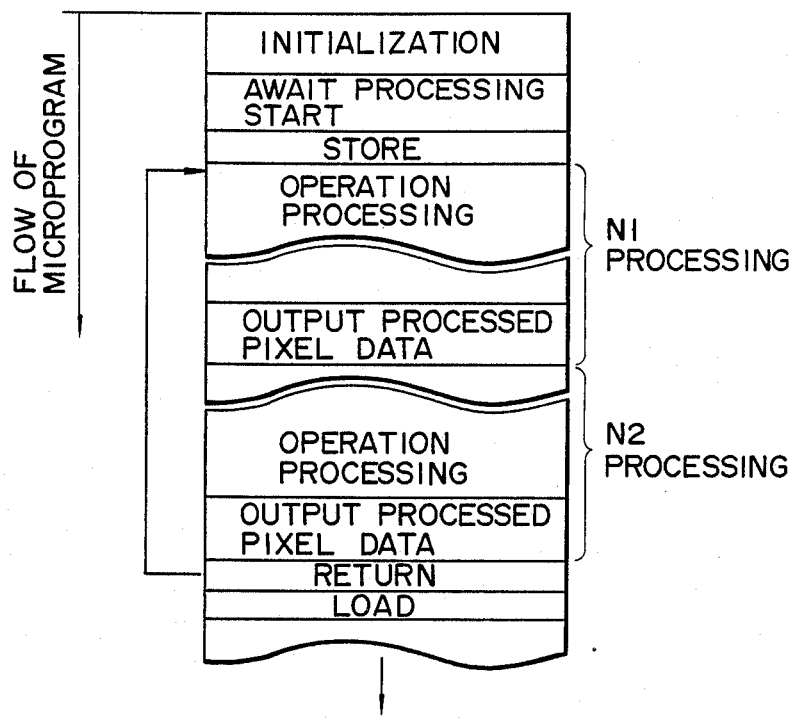
FIG. 8 is an illustration showing a schematic microprogram for the processing in the apparatus shown in FIG. 6.

The image processing sequence of X-ray image data by the image processing apparatus 3A with the above arrangement will be described with reference to FIGS. 7 and 8. FIG. 7 shows each pixel data p of the X-ray image data when parameters N1 and N2 indicating the unsharp mask sizes are set to be 9 and 3, respectively. FIG. 8 schematically shows a microprogram stored in the memory 8. Coordinates $S(i-((N1-1)/2), j-((N1-1)/2))$ shown in FIG. 7 are the same as coordinates $S(i-((N-1)/2), j-((N-1)/2))$ shown in FIG. 3. A difference between the microprograms shown in FIGS. 4 and 8 is as follows. The program shown in FIG. 4 consists of the operation step of the formula (1) and the output command of the pixel data obtained from the operation. In the program shown in FIG. 8, the operation step of the formula (1), with the parameter N1 and the output command of the pixel data obtained from the operation, and the operation step of the formula (1), with the parameter N2 and the output command of the pixel data obtained from the operation, are sequentially provided in the processing of one pixel.

Basically, the image processing 3A executes the X-ray image data processing in accordance with substantially the same image processing algorithm as that of the conventional apparatus shown in FIG. 2.

First, an initialization start command is sent from the CPU to the sequencer 9. In response to this command, the sequencer 9 supplies an instruction address for the command to the memory 8.

The memory 8 simultaneously supplies the micro code instruction read out from the designated address to the unit 10 and the memory 6A. Upon reception of this instruction, operation parameters based upon predetermined processing information (normally set by an operator) supplied from a control console are set in the unit 10. The operation parameters are, in this case, the emphasis coefficients $\beta_1$ and $\beta_2$, the gradation coefficients $\gamma_1$ and $\gamma_2$, and the parameters N1 (=9) and N2 (=3) for the unsharp mask sizes.

When these parameters are set, the sequencer 9 accesses a processing standby instruction as the next step in the processing microprogram, and awaits a processing start command sent from the CPU at an identical program count position in the processing microprogram. While waiting, the microprogram is in a hold state.

The CPU checks the standby state of other peripheral equipment, and when checking is completed, supplies the processing start command to the sequencer 9.

When the sequencer 9 receives the processing start command, the microprogram advances to the step for processing each pixel p.

The microprogram first advances to the step for processing with the parameter N1, and starts the operation based upon the formula (1). This operation is successively conducted for respective pixels in the first line of the unsharp mask in a predetermined pixel processing direction as shown in FIG. 7, i.e., in the column direction. When the pixel processing step of the microprogram is to be repeated, the number of repetitions to be conducted is set in the sequencer 9 in advance. The pixel data obtained from the pixel processing is temporarily stored in the memory 6A.

The microprogram then advances to the processing step using the parameter N2 and conducts the same pixel processing as that using the parameter N1. In order to do this, the coordinates of the unsharp mask for processing using the parameter N2 are set in the sequencer 9 in advance. Since N1=9 and N2=3, the processing of the first line with the parameter N1 is skipped, and the microprogram advances to the pixel processing step for the second line after line switching has been accomplished.

In this case, the coordinates at which the processing using the parameter N2 is to be performed are set in a matrix of $S(i-((N1+1)/2), j-((N1+1)/2))$ to $S(i-((N1-N2)/2), j-((N1-N2)/2))$ to have the coordinates $S(i-((N1-1)/2), j-((N1-1)/2))$ as the central point.

In the second and third lines of the N1×N1 unsharp mask, only the processing procedure for the parameter N1 is executed, and the results of the processing are temporarily stored in the memory 6A.

In the pixel processing for the fourth line of the microprogram, after processing with the parameter N1 (in this embodiment, processing for nine pixels since N1=9) is executed, processing with the parameter N2 (in this embodiment, processing for three pixels since N2=3) is executed.

Processing with the parameter N2 is executed using the pixel data at points $S(i-((N1+1)/2), j-((N1+1)/2))$ to $S(i-((N1-N2)/2), j-((N1+1)/2))$.

Similarly, in the fifth and sixth lines, the processing procedures for nine pixels using the parameter N1 and for three pixels using the parameter N2 are executed, and the processed pixel data are temporarily stored in the memory 6A.

The pixel processing procedures in the seventh to ninth lines are the same as those in the first to third lines.

As a result, 81 processed pixel data using the parameter N1 and 9 processed pixel data using the parameter N2 are obtained from respective pixel data of the unsharp masks, and are temporarily stored in the memory 6A.

In response to an instruction address supplied from the sequencer 9, the micro code corresponding to the designated address is sent from the memory 8 to the unit 10. Upon reception of this micro code, the unit 10 conducts the following operation using the processed pixel data using the parameter N1 so as to obtain unsharp mask data Sus1:

$$Sus1 = \Sigma_{i,j} Si,j/N1^2$$

Furthermore, subtraction $(S0-Sus1)$, multiplication $\beta 1(S0-Sus1)$, frequency emphasis processing $[S0+\beta 1(S0-Sus1)]$, and gradation processing $S1=\gamma 1[S0+\beta 1(S0-Sus1)]$ are sequentially conducted.

Simultaneously, in the same manner as the calculation of the unsharp mask data Sus1, unsharp mask data Sus2 is calculated for every line from the following operation and alternates with the processing using the parameter N1:

$$Sus2 = \Sigma_{i,j} Si,j/N2^2$$

Furthermore, subtraction $(S0-Sus2)$, multiplication $\beta 2(S0-Sus2)$, frequency emphasis processing $[S0+\beta 2(S0-Sus2)]$, and gradation processing $S2=\gamma 2[S0+\beta 2(S0-Sus2)]$ are sequentially conducted.

Figure 9:
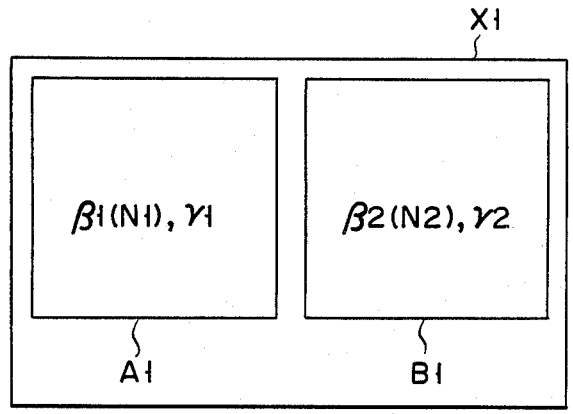
FIG. 9 is an illustration schematically showing an image formed on a recording medium by the processing of the apparatus shown in FIG. 6.

In this manner, two X-ray image data having different emphasis coefficients $\beta$, gradation coefficients $\gamma$, and parameters N of the unsharp mask are formed. Therefore, the image data processed by the image processing is supplied to the image reproduction apparatus 4. As a result, in the image recording apparatus 5, as shown in FIG. 9, two processed images A1 and B1 subjected to different frequency emphasis and gradation processing procedures and having different contrasts are formed on a single recording medium X1.

Note that, for example, when the parameters N1 and N2 of the unsharp mask are set to be N1=N2, the same processed image as in the conventional image processing apparatus shown in FIG. 2 can be formed.

Figure 11:
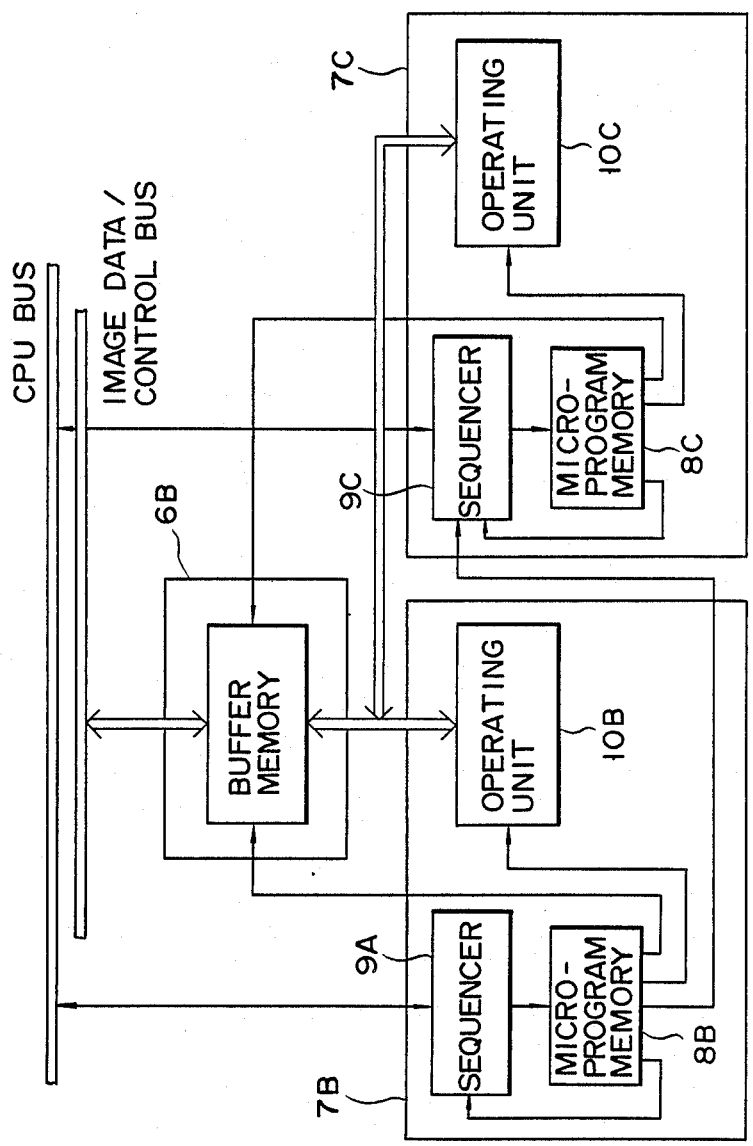
FIG. 11 is a block diagram showing a detailed arrangement of the image processing apparatus shown in FIG. 10.

FIG. 10 shows a schematic arrangement of an image processing apparatus according to the second embodiment of the present invention, and FIG. 11 shows a detailed arrangement thereof. In the second embodiment, two image data processing units and an image data memory accessed by both the image processing units are provided. According to the second embodiment, processing efficiency and time can be further shortened when compared to the first embodiment wherein parameters for two processed images A1 and B1 are processed at every line using different parameters N1 and N2.

An image processing apparatus 3B comprises a buffer memory 6B, a master image processor 7B and a slave image processor 7C, as shown in FIG. 10. The buffer memory 6B is the same temporary image data storage memory as the buffer memory 6 in the conventional apparatus shown in FIG. 2. The master and slave image processors 7B and 7C process X-ray image data stored in the buffer memory 6B in accordance with a given image processing algorithm, and execute the processing in accordance with a microprogram (to be described later) in response to commands from a CPU.

As shown in FIG. 11, the master image processor 7B comprises a microprogram memory 8B, a sequencer 9B, and an operating unit 10B. The microprogram memory 8$\beta$ stores a microprogram for processing (to be described later), and micro code instructions of the microprogram to be read out from the microprogram memory 8B as desired. The microprogram memory 8B comprises a pipeline register utilized for reading out the micro codes. The sequence 9B supplier to the microprogram memory 8B the address of an instruction to be read out in response to commands supplied from the CPU through a CPU bus, thereby controlling the microprogram. The operating unit 10B conducts a calculation of image data stored in the buffer memory 6B in response to the micro code generated from the memory 8B accessed by the sequencer 9B. The operating unit 10B has four arithmetic operation functions, and can conduct an operation in accordance with the formula (1).

The slave image processor 7C has substantially the same arrangement as that of the master image processor 7B. That is, the slave image processor 7C comprises a microprogram memory 8C, a sequence 9C and an operating unit 10C. The microprogram memory 8C stores a microprogram different from that of the microprogram of the memory 8B, as will be described later. The sequencer 9C receives signals from the microprogram memory 8B. Despite these differences, the microprogram memory 8C, the sequencer 9C and the operating unit 10C are the same as the memory 8B, the microprogram sequencer and the operating unit 10B.

A plurality of micro codes generated from the microprogram memories 8B and 8C are also supplied to the buffer memories 6B and 6C. Signals for controlling flow sequence of the apparatus 3B are fed back from the microprogram memories 8B and 8C to the sequencers 9B and 9C, respectively.

The micro code group has a bit length of, e.g., 32 to 64 bits, and serves as a control signal for directly controlling the operating units 10B and 10C and the microprogram memories 6B and 6C.

A clock signal having a period on the order of, e.g., several hundred of nanoseconds for synchronizing the processors 7B and 7C and the buffer memory 6B is prepared, and is controlled by the CPU so as to execute the microprogram.

Each of the processors 7B and 7C stores a $\beta$ table including a plurality of emphasis coefficients $\beta 1$, $\beta 2$, etc. and a $\gamma$ table including a plurality of gradation coefficients $\gamma 1$, $\gamma 2$, etc.

Figure 12:
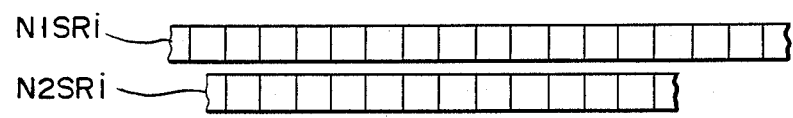
FIG. 12 is a view for explaining image processing of the apparatus shown in FIG. 11.
Figure 15:
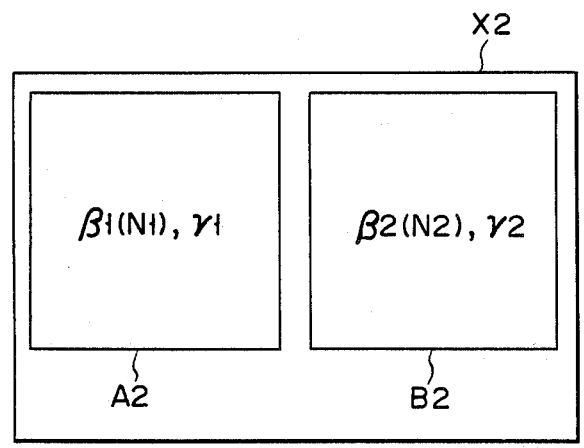
FIG. 15 is an illustration schematically showing an image formed on a recording medium by the processing of the apparatus shown in FIG. 11.
Figure 13:
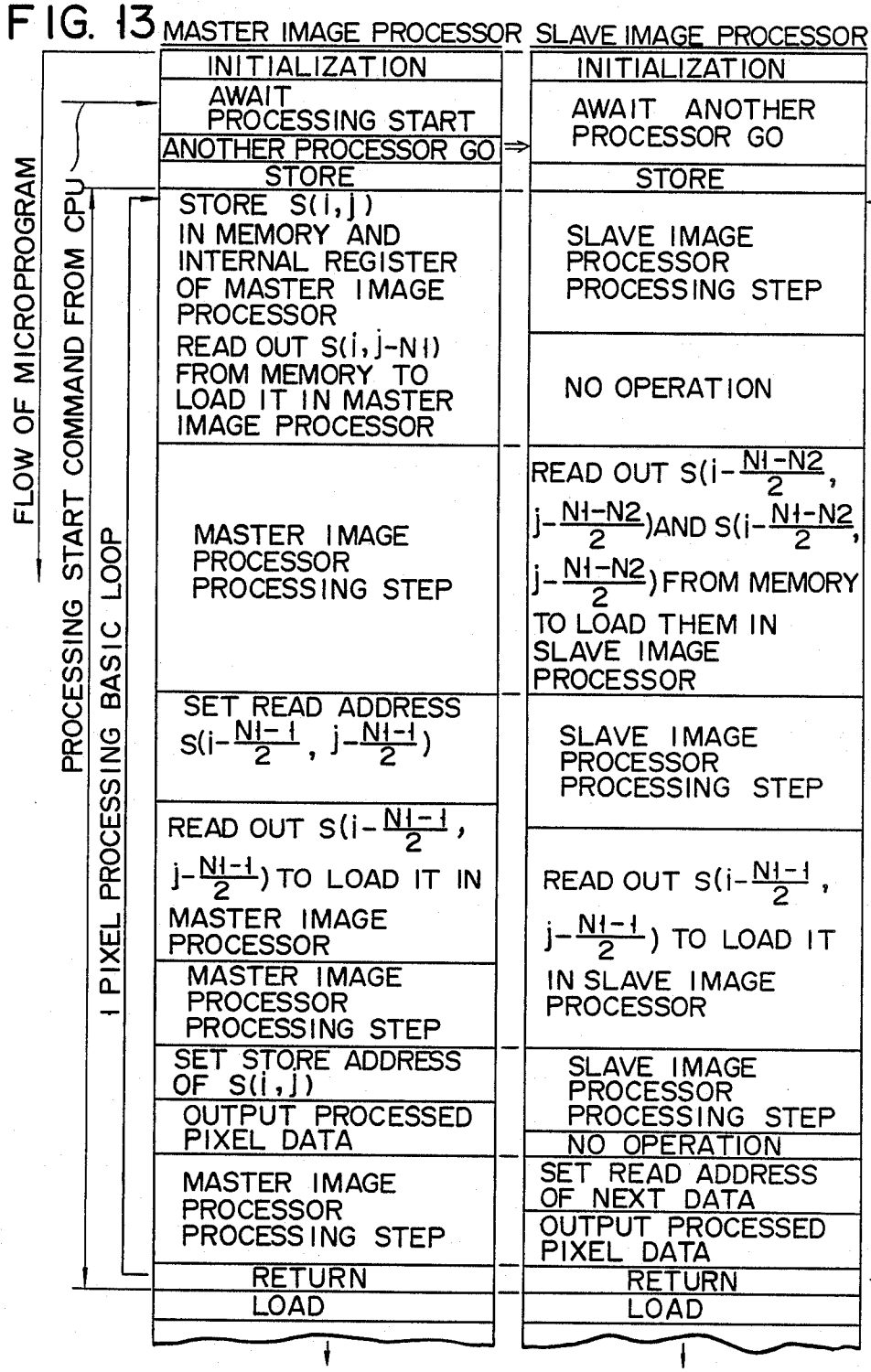
FIG. 13 is an illustration schematically showing a microprogram for the processing in the apparatus shown in FIG. 11.
Figure 14:
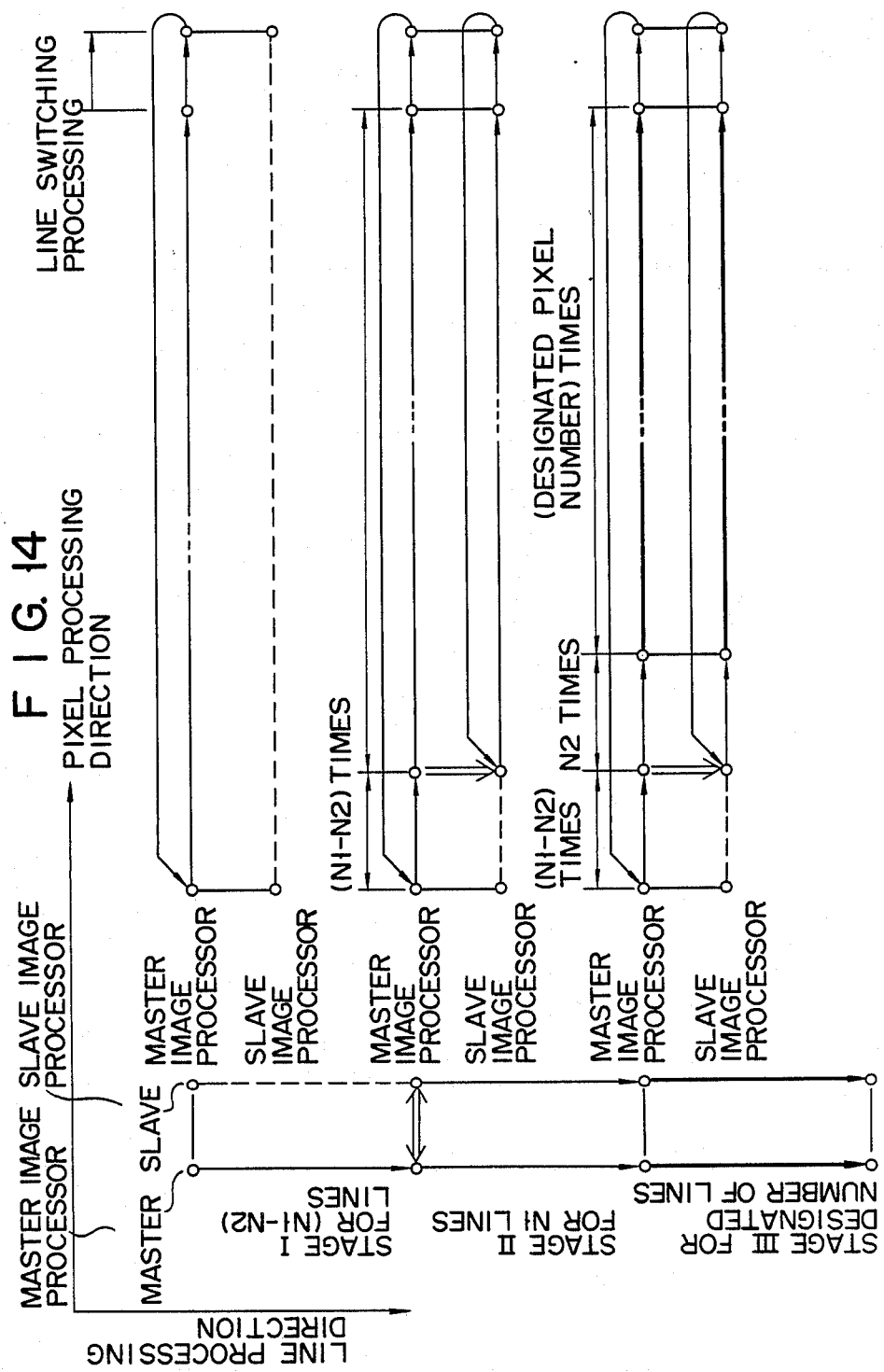
FIG. 14 is an illustration schematically showing the processing of the microprogram shown in FIG. 13.

The image processing sequence of X-ray image data by the use of the image processing apparatus 3B with the above arrangement will be described with reference to FIGS. 7, 12, 13, and 14. FIG. 7 shows individual pixel data of the X-ray image data when parameters N1 and N2 indicating unsharp mask sizes are set to be 9 and 3, respectively. FIG. 12 shows a content of a register used in the processing. FIG. 13 schematically shows the microprograms stored in the microprogram memories 8B and 8C. FIG. 14 shows the control sequence of the X-ray image data. A difference between the microprograms shown in FIGS. 13 and 4 is as follows. The microprograms memories 8B and 8C store the microprograms which allow separate processing procedures in such a manner that, in the pixel processing basic loop of FIG. 13, the processors 7B and 7C separately access the buffer memory 6B, and the processing procedures using the parameters N1 and N2 are sequentially performed by the processors 7B and 7C, respectively.

The buffer memory 6B comprises a longitudinal direction register N1SRi of the parameter N1 (shown in FIG. 12) and a register N1T (not shown) for storing N1×N1 accumulation data for the master image processor 7B; a longitudinal direction register N2SRi (shown in FIG. 12), a register N2T (not shown) for storing N2×N2 accumulation data for the slave image for the processor 7C; and an image memory.

Basically, the image processing apparatus 3B executes the X-ray image data processing according to the same image processing algorithm as that of the conventional apparatus shown in FIG. 2.

First, an initialization start command is sent to the sequencers 9B and 9C from the CPU. In response to this command, the sequencers 9B and 9C respectively supply to the microprogram memories 8B and 8C the instruction addresses corresponding to the command.

The microprogram memories 8B and 8C simultaneously supply the micro code instructions, read out from the designated addresses to the operating units 10B and 10 C and the buffer memory 6A, respectively.

Operation parameters for the processors 7B and 7C in accordance with given processing information supplied from a control console (not shown) are set in the operating units 10B and 10C. In this case, the operation parameters include the emphasis coefficients $\beta 1$ and $\beta 2$, gradation coefficients $\gamma 1$ and $\gamma 2$, and the parameters N1 (=9) and N2 (=3) for the unsharp mask sizes. The larger of the parameters N1 and N2 is set in the master image processor 7B. These parameters can be directly set in the operating units operating 10B and 10C by the CPU.

When the parameter setting operation is completed, the sequencer 9B of the master image processor 7B accesses a processing start standby instruction as the next step of the microprogram, and awaits a processing start command from the CPU at an identical program count position on the microprogram. Meanwhile, the sequencer 9C of the slave image processor 7C accesses "another processor go" standby instruction, and awaits supply of an "another processor go" command from the master image processor 7B at an identical program count position on the microprogram.

While waiting, the microprogram is in a hold state.

The CPU checks the standby state of peripheral equipment, and when checking is completed, supplies a processing start command to the sequencer 9B.

When the processing start command is supplied to the sequencer 9B, the master image processor 7B supplies the "another processor go" command to the processor 7C. Therefore, both the processors 7B and 7C enter into their individual processing routines at the same time.

The master image processor 7B advances to the processing step using the parameter N1, and the operation processing based on the formula (1) is started. This processing is successively executed for respective pixels in the first line of the unsharp mask in a pixel processing direction as shown in FIG. 7, i.e., in a column direction. When the number of repetitions to be conducted is set by a store command to the sequencer 9B in advance, the microprogram repeats execution of the pixel processing according to the preset number. The pixel data obtained from the processing is temporarily stored in the buffer memory 6B.

Meanwhile, the slave image processor 7C advances to the processing step using the parameter N2 so as to execute the same pixel processing as described above. However, in this case, coordinates of the unsharp mask for executing the processing using the parameter N2 are set in the sequencer 9C. Thus, since N1 =9 and N2=3, the pixel processing for the first line of the parameter N1 is skipped, and the processing using the parameter N2 is advanced to that for the second line after line switching has been accomplished.

Referring to FIG. 14 showing the processing sequences of the processors 7B and 7C, the above processing procedure belongs to Stage I. After 1-pixel processing basic loops are repeated for the designated number of times of pixel processing, control advances to the next stage.

In this case, coordinates at which the processing using the parameter N2 is executed are set at a matrix of points $S(i-((N1+1)/2), j-((N1+1)/2))$ to $S(i-((N1-N2)/2), j-((N1-N2)/2))$ to have a point of the coordinates $S(i((N1-1)/2), j-((N1-1)/2))$ as the central point in the same manner as in the first embodiment of the present invention.

However, the processing using the parameter N1 is executed for the second to sixth lines of the N1×N1 unsharp mask, and the processed results are temporarily stored instored ion the buffer memory 6B.

In the pixel processing of the seventh line, control advances to the Stage II processing procedure as shown in FIG. 14. After the processing using the parameter N1 (in this embodiment, pixel processing for nine pixels, since N1=9 ) is executed (N1 to N2 times), the slave image processor 7C executes the processing for the parameter N2 (in this embodiment, pixel processing for three pixels s N2=3) in response to the "another processor go" supplied from the master image processor 7B to the slave image processor 7C.

Processing using the parameter N2 is executed with respect to respective pixel data at points $S(i-((N1+1)/2), j-((N1+1)/2))$ to $S(i-((N1-N2)/2), j-((N1+1)/2))$.

Similarly, in the eighth and ninth lines, the pixel processing procedures for nine pixels using the parameter N1 and for three pixels using the parameter N2 are separately executed, and processed, pixel data is temporarily stored in the buffer memory 6B.

Since processing using the parameter N2 is delayed from the start of that using the parameter N1 by (N1−N2) lines, when Stage II processing is completed, the processing in the N1×N1 unsharp mask shown in FIG. 12 has also been completed.

In this manner, 81 and 9 processed pixel data for the parameters N1 and N2 respectively are obtained from the respective pixel data of the unsharp masks, and are temporarily stored in the buffer memory 6B.

More specifically, with the above processing, data obtained by accumulating data using the parameters N1 and N2 in a longitudinal direction, i.e., a row direction for the number of pixels designated by the processors 7B and 7C, and data for the N1×N1 and N2×N2 unsharp masks are temporarily stored in the buffer memory 6B.

Next, control advances to the processing in Stage III. In response to an instruction address supplied from the seqeuncer 9B, the microprogram memory 8B supplies the micro code corresponding to the address to the operating unit 10B. According to this micro code, the operating unit 10B conducts the following calculation with the processed pixel data using the parameter N1 so as to obtain unsharp mask data Sus1:

$Sus1 = \Sigma_{i,j} Si,j/N]2$

Furthermore, the unit 10B sequentially conducts subtraction (S0−Sus1), multiplication $\beta1(S0-$−$ Sus1)$, frequency emphasis processing $[S0+\beta1(S0-Sus1)]$, and gradation processing $S1=\gamma1[S0+\beta1(S0-Sus1)]$. When this processing is performed, N1×N1 data is calculated as follows:

(a) Data from the register N1SR(i−N1) is subtracted from the accumulation data from the register N1T, and the calculated result is stored in the register N1T. (b) Data at a point S(i,j−N1) is subtracted from data from the register N1SRi, and the calculated result is stored in the register N1SRi. (c) Data from the register N1SRi is added to data at a point S(i,j), and a sum is stored in the register N1SRi. (d) Data from the register N1T is added to data from the register N1SRi, and a sum is stored in the register N1T.

When the "another processor go" command is supplied from the master image processor 7B to the slave image processor 7C, the slave image processor 7C calculates unsharp mask data Sus2 with the processed pixel data using the parameter N2 at the above-mentioned coordinates in accordance with the following operation:

$Sus2 = \Sigma_{i,j} Si,j/N2^2$

Furthermore, the operating unit 10B sequentially conducts subtraction traction (S0−Sus2), multiplication $\beta2(S0-Sus2)$, frequency emphasis processing $[S0+\beta2(S0-Sus2)]$, and gradation processing $S2=\gamma2[S0+\beta2(S0-Sus2)]$.

In this case, SO is a value at a point $S(i-((N1-1)/2, j-((N1-1)/2))$.

As can be seen from FIG. 13, the above-mentioned microprograms are set so as to synchronously execute respective 1-pixel processing basic loops, and so as not to simultaneously access the buffer memory 6B.

The 1-pixel processing basic loop in each microprogram has a step configuration so as to be executed in the same period of time as the microprogram shown in FIG. 4.

In this manner, in the image processing apparatus 3B, two different X-ray image data having different emphasis coefficients $\beta$, gradation coefficients $\gamma$ and parameters N of unsharp masks are formed. Thus, the image data processed by the image processing 3B is supplied to the image reproducing apparatus 4, and as a result, in the image recording apparatus 5, two processed images A2 and B2 subjected to different frequency emphasis and gradation processing procedures and having different contrasts are formed on a single recording medium X2.

Also, in this embodiment, when the parameters N1 and N2 of the unsharp masks are set to be N1=N2, the same processed image as in the conventional image processing apparatus shown in FIG. 2 can be formed.

We claimed:

1. An image processing apparatus in a radiation image recording system in which radiation image data SO obtained by detecting radiation transmitted through an object to be examined is supplied to an image processing apparatus, said image processing apparatus calculates unsharp mask data Sus corresponding to each pixel data of the radiation image data SO and conducts an operation represented by $S=\gamma[S0+\beta(S0-Sus)]$ (where $\beta$: an emphasis an emphasis coefficient, $\gamma$: a gradation coefficient) so as to obtain processed image data through frequency emphasis processing and gradation processing of the radiation image data so, and the processed image data obtained by said image processing apparatus is supplied to image recording means so as to form an image corresponding to the original image on a single recording medium, wherein s aid processing apparatus comprises:

parameter setting means for setting two different mask sizes; and image processing means for calculating two unsharp mask data Sus1 and Sus2 for the two different mask sizes set by said parameter setting means so as to form, at substantially the same time, two sets of processed image data by frequency emphasis processing and gradation processing of the radiation image data using the unsharp mask data Sus1 and Sus2 whereby two images which correspond to the same original image and have different contrasts are formed on said single recording medium on the basis of said two sets of processed image data.

2. An apparatus according to claim 1, wherein said image processing means includes memory means for storing original image data subjected to processing, data formed during a processing procedure, and processed image data obtained from the processing, and operation processing means for calculating the two unsharp mask data Sus1 and Sus2 for the two different mask sizes by utilizing said memory means and for conducting an operation for frequency emphasis processing and gradation processing using the unsharp mask data Sus1 and Sus2.

3. An apparatus according to claim 2, wherein said operation processing means includes a microprogram memory storing a microprogram for predetermined operation processing, a sequencer for controlling reading out of the microprogram from the microprogram memory, and an operating unit, having a four-arithmetical operation function, for conducting an operation according to the microprogram.

4. An apparatus according to claim 2, wherein said operation processing means includes first operation means for calculating the unsharp mask data Sus1 and Sus2 for parameters N1 and N2 of the two different mask sizes, respectively, and second operation means for calculating, at substantially the same time, two processed image data by frequency emphasis processing and gradation processing of the radiation image data using the unsharp mask data Sus1 and Sus2, respectively.

5. An apparatus according to claim 4, wherein said first operation means is means for conducting operations respectively associated with the unsharp mask data Sus1 and Sus2 using the different parameters N1 and N2 at every line processing.

6. An apparatus according to claim 4, wherein said second operation means is means for conducting operations respectively associated with two different processed image data using the different unsharp mask data Sus1 and Sus2 at every line processing.

7. An apparatus according to claim 1, wherein said image processing means includes memory means for storing original image data subjected to processing, data formed during a processing procedure, and processed image data obtained from the processing, and first and second operation processing means, substantially synchronized with each other, for calculating two unsharp mask data Sus1 and Sus2 by commonly using said memory means and for conducting an operation of frequency emphasis processing and gradation processing using the unsharp mask data Sus1 and Sus2.

8. An apparatus according to claim 7, wherein each of said first and second operation processing means includes a microprogram memory storing a microprogram for predetermined operation processing, a sequencer for controlling reading out of the microprogram from the microprogram memory, and an operating unit, having a four-arithmetical operation function, for conducting an operation according to the microprogram.

9. An apparatus according to claim 7, wherein said first operation processing means includes first operation means for calculating the unsharp mask data Sus1 using a parameter N1 of a first mask size; and second operation means for calculating first processed image data by frequency emphasis processing and gradation processing of the radiation image data using the unsharp mask data Sus1 obtained by said first operation means, and said second operation processing means includes third operation means for calculating the unsharp mask data Sus2 using a parameter N2 of a second mask size; and fourth operation means for calculating second processed image data by frequency emphasis processing and gradation processing of the radiation image data using the unsharp mask data Sus2 obtained by said third operation means.

10. An apparatus according to claim 9, wherein said first and third operation means are means for conducting operations so that calculations of the unsharp mask data Sus1 and Sus2 for each pixel are substantially synchronously performed.

11. An apparatus according to claim 9, wherein said second and fourth operation means are means for conducting operations so that calculations of two different processed image data for each pixel are substantially synchronously performed.

* * * * *

UNITED STATES PATENT AND TRADEMARK OFFICE
CERTIFICATE OF CORRECTION

PATENT NO. : 4,819,188

DATED : April 4, 1989

INVENTOR(S) : Mitsuyoshi Matsubata et al.

It is certified that error appears in the above-identified patent and that said Letters Patent is hereby corrected as shown below:

Claim 1, line 54, change "s aid" to --said--.

Signed and Sealed this

Twenty-sixth Day of June, 1990

Attest:

HARRY F. MANBECK, JR.

*Attesting Officer*  *Commissioner of Patents and Trademarks*